Figure 1:
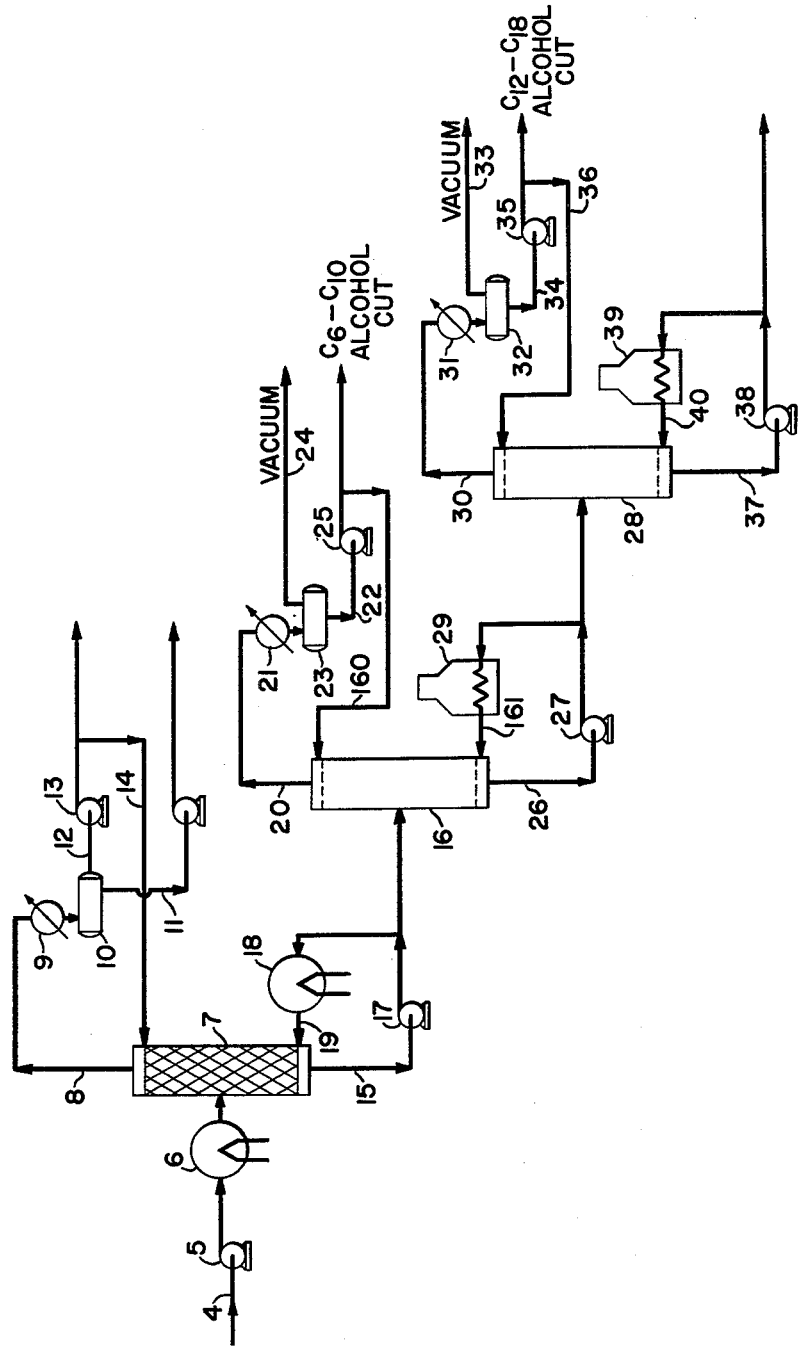
Figure 2:
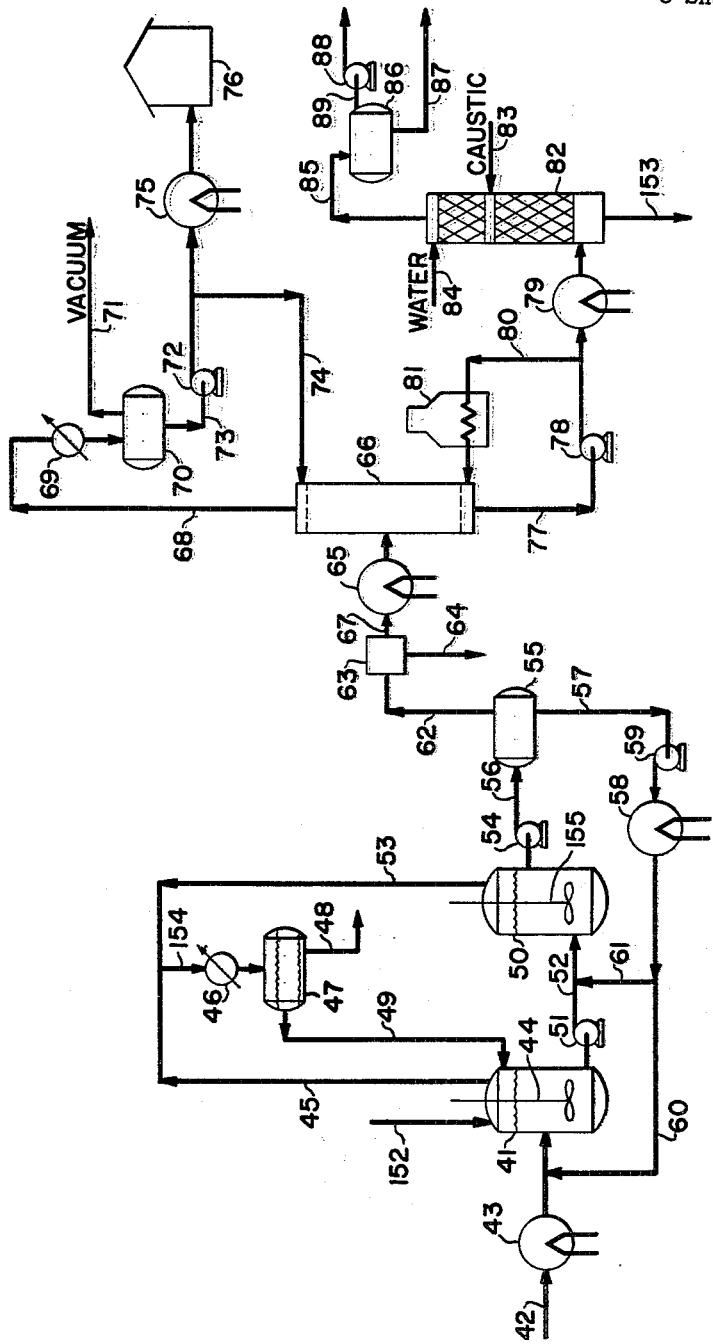
Figure 3:
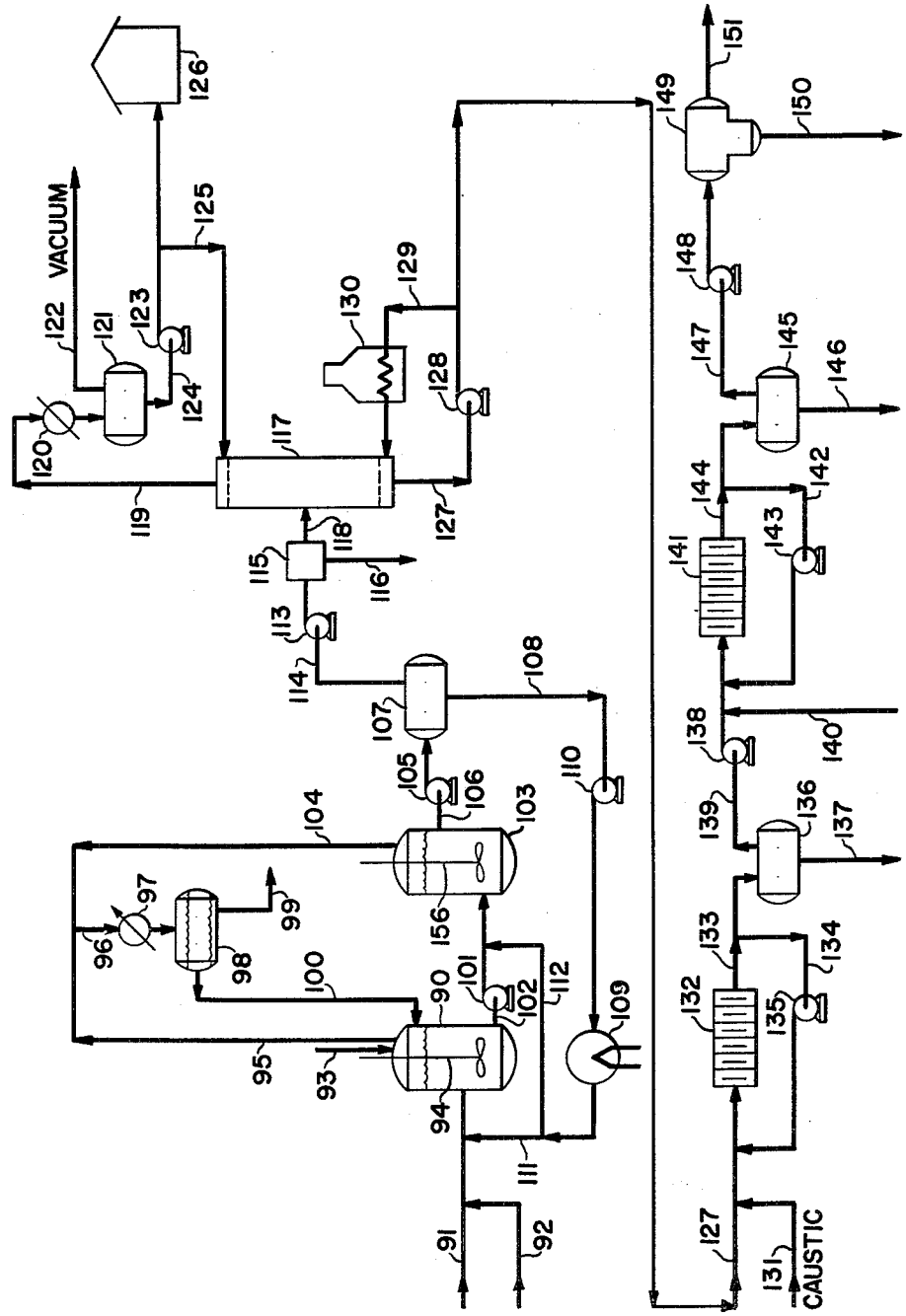

June 8, 1965

C. ROMING, JR 3,188,354

PROCESS FOR PURIFYING ALCOHOLS

Filed July 1, 1959

3 Sheets-Sheet 1

Charles Roming, Jr. Inventor

By R. D. Manalan Patent Attorney

Charles Roming, Jr. Inventor

Charles Roming, Jr. Inventor

By R. D. Manahan Patent Attorney

United States Patent Office 3,188,354
Patented June 8, 1965

3,188,354
PROCESS FOR PURIFYING ALCOHOLS
Charles Roming, Jr., Towaco, N.J., assignor to Esso Research and Engineering Company, a corporation of Delaware
Filed July 1, 1959, Ser. No. 824,389
3 Claims. (Cl. 260—643)

The present invention relates to the purification of alcohols, especially alcohol mixtures containing non-alcohol substances having analogous boiling points. More specifically, it concerns a method of separating and purifying alcohols contaminated with non-alcohol materials which involves esterifying the alcohols, separating the esters from the mixture by distillation and recovering substantially pure alcohols from the esters.

In the production of alcohols by the so-called AM (alkyl metal) alcohol process an olefin such as ethylene is grown on an alkyl metal, e.g. triethyl aluminum, at elevated temperatures and superatmospheric pressures and the growth reaction product is thereafter oxidized and hydrolyzed to permit the recovery of straight chain primary alcohols and the oxide or hydroxide of the metal, e.g. alumina or aluminum hydroxide. The length and the distribution of the alkyl radicals in the trialkyl aluminum growth product vary with the operating conditions and length of reaction time. Generally, the growth product is a smear of various compounds wherein the alkyl radicals will contain about 2–26 carbon atoms, the average radical having about 8—18 carbon atoms, although this can be varied as desired.

When the alcoholate or alkoxide, obtained by oxidizing the ethylene growth product, is hydrolyzed the reaction product contains not only the desired straight chain alcohols, but additionally, several types of non-alcohol substances, such as olefins, paraffins, ketones, aldehydes and acids. In general, these non-alcohol materials have carbon chain lengths corresponding to that of each of the alcohols produced and, hence, analogous boiling points. Therefore, in order to effect a clean separation of the alcohols from the other components, it is necessary to employ difficult and expensive fractionating techniques. Moreover, since a substantial quantity of these alcohols are used to prepare plasticizing esters, it is essential to reduce the carbonyl values of the finished alcohols to very low levels. It has been noted that if there are significant quantities of carbonyl compounds in the alcohols, low quality esters not suitable for use as plasticizers are obtained. It is believed that the color bodies in the alcohols and the plasticizing esters derived therefrom are formed by carbonyl type compounds which are present in the alcohol product. While the dark color produced by the carbonyl compounds may be prevented to some extent by the use of reducing agents, e.g. sodium borohydride, these agents appear to be ineffective where substantial quantities of color-forming oxygenated compounds are present.

It has now been discovered that contaminated alcohol mixtures can easily and efficiently be purified by esterifying the alcohols, separating the esters formed from the non-alcohol contaminants by distillation and decomposing (hydrolyzing or saponifying) the esters with an inorganic hydroxyl-containing compound to obtain the alcohol products. An important feature of the invention is the utilization of a polybasic acid which is capable of forming an ester that has a boiling point substantially above that of the alcohol reactant so that the boiling point of the lowest boiling ester formed therefrom is sufficiently above that of the highest boiling non-alcohol contaminant to effect the desired separation. It has been found that excellent separations can be effected by using polybasic acids which produce esters that boil at least about 70° F. higher than the corresponding alcohol.

While the process of the present invention may be employed to purify any alcohol-containing mixture, it has special application to the alcohol mixtures obtained in the AM alcohol process. Where the alcohol mixture to be purified has a carbon number spread of more than 5 or 6, it is advisable to distill and fractionate the mixture into gross cuts having up to 5 or 6 carbon numbers. While this first step is not necessary if the alcohol mixture is narrow boiling, it is an important pretreatment step for alcohol mixtures such as those obtained in the conventional AM alcohol process. In either case, the gross cut or the narrow boiling alcohol mixture is esterified according to any suitable conventional technique and the ester product is thereafter stripped, using conventional means such as vacuum distillation or inert gas stripping, of the lower boiling non-alcohol materials. The higher boiling esters are recovered as bottoms from the distillation zone, hydrolyzed under basic conditions, such as scrubbing or otherwise contacting them with an aqueous solution of sodium or potassium hydroxide, and separated from the excess reactants and acid salts formed and then purified. The separated, purified alcohols can be dried and fractionated as desired into suitable narrower boiling alcohol fractions, especially when they are to be employed in the preparation of plasticizing esters. Generally, those alcohols containing about 6 to 12 carbon atoms are used for this purpose.

The invention will be more fully understood by referring to the accompanying drawings in which:

FIGURE I is a flow diagram showing a process for separating AM alcohols into gross cuts;

FIGURE II is a flow diagram showing a process for purifying a $C_6$ to $C_{10}$ AM alcohol cut in accordance with the invention;

FIGURE III is a flow diagram showing a process for purifying a $C_{12}$ to $C_{18}$ AM alcohol cut in accordance with the invention.

The polybasic acids used to make the esters in this process are preferably tribasic acids, however, dibasic acids may also be employed. The boiling point elevation of the esters derived from commonly available monobasic acids is too small to make them useful in this invention. In selecting the polybasic acid, it is important to take into consideration the boiling point of its esters. The boiling point should be sufficiently above that of the alcohol, e.g. about 70° F., to afford an easy separation by distillation. Moreover, the acid should be relatively non-corrosive to ordinary construction materials, and should form an ester which is stable at temperatures up to 400 or 500° F. Because the esters should be readily saponifiable under ordinary conditions, inorganic acids are more suitable for use in the present invention than organic acids and andydrides which generally require more severe esterification conditions. Boric acid is thus highly and almost uniquely suitable. Other acids which may be employed to effect the separation of alcohols from other materials in accordance with the invention are inorganic acids such as phosphoric, sulfurous and sulfuric, and less preferably organic acids or anhydrides, such as a $C_2$ to $C_{10}$ polybasic hydrocarbon acid, e.g. adipic, succinic, oxalic, sebacic, maleic and phthalic.

The alcohols in an AM alcohol mixture, having the following general composition, are fractionated into gross cuts and purified in accordance with a preferred embodiment of the process:

AM ALCOHOL MIXTURE

| Component: | Mole percent |
|---|---|
| Alcohols | 50–95 |
| Olefins | 3–10 |
| Paraffins | 2–40 |
| Non-alcohol oxygen-containing compounds | 0.5–2 |
| Water | 0–10 |

The concentration of carbonyl type compounds in AM alcohol mixtures is usually of the order of 0.2 to 2.0 mole percent, depending upon the molecular weight range. This value must be reduced to about 0.02 to 0.06 mole percent in order to obtain water white plasticizing esters from these alcohols. The above described alcohol mixture, which has a carbon number spread of $C_2$ to about $C_{18}$, is fed into a distillation zone where water, $C_2$ to $C_6$ hydrocarbons and ethyl alcohol are fractionated from the mixture. The higher boiling bottoms recovered from the distillation zone is then separated into two gross cuts, namely an impure $C_4$ to $C_{10}$ alcohol mixture and an impure $C_{12}$ to $C_{18}$ alcohol mixture. This may be achieved by introducing the bottoms from the first distillation zone into a second distillation zone which is maintained at a low enough pressure to limit the maximum tower bottoms temperature to about 450° F. or lower to avoid thermal degradation. The lighter alcohol cut, which is taken overhead from this second distillation zone, contains analogous boiling hydrocarbons and oxygenated non-alcohol compounds. The heavier alcohol fraction withdrawn from the bottom of the second distillation zone also contains contaminating hydrocarbons and non-alcohol oxygenated compounds. This heavier alcohol bottoms cut may again be subjected to further distillation in a third zone so that the gross cut has a carbon number spread no greater than 5 to 6. Of course, there are minor amounts of lighter and heavier components present in the cut.

The light and heavy gross cuts are then separately esterified with the selected polybasic acid at an elevated temperature, e.g. 200 to 280° F. (Since boric acid is the preferred polybasic acid, it will be employed in the subsequent description of the process.) Each of the above crude alcohol cuts is introduced to an esterifying zone which contains an excess of boric acid and an efficient stirring device to permit intimate contact of the reactants. Finely divided boric acid, e.g. 100 to 200 mesh, is conveniently employed to esterify the alcohol in the esterification zone. The excess solid boric acid may then be settled and/or filtered from the liquid phase ester, which is then stripped of substantially all hydrocarbons, oxygenated non-alcoholic compounds, and other non-esterifiable materials which may be present. This may be achieved by introducing the liquid to a distillation zone which is maintained at a sufficiently reduced pressure to limit thermal degradation of the ester bottoms. The hydrocarbons and other lower boiling non-esterified components taken overhead in the distillation zone have essentially fuel value.

In any event the borate triester bottoms, the lightest ester of which boils about 20 to 30° F. or higher above the highest boiling non-alcohol component in the overhead product of said distillation zone, is transferred to a saponification zone and admixed with sufficient alkali metal hydroxide, e.g. 50 parts by volume of 10 wt. percent aqueous potassium or sodium hydroxide, at atmospheric pressures and ambient or moderately higher temperatures, e.g. 200° F., to release the alcohols and convert the inorganic portion of the esters to the corresponding salts. The saponified reaction product may then be sent to a settling zone where the excess reactants and water soluble acid salts are removed from the alcohol product by gravity separation. Other suitable saponification-separation means, such as packed-tower and countercurrent liquid-liquid contacting, may also be employed. The wet alcohol mixture from the saponification zone may be dried by any suitable means known to the art and then fractionated as desired to recover dry, pure alcohol fractions.

Other esterification and alcohol recovery procedures may be employed. For instance, the following liquid phase ester exchange method, wherein the acid in the ester is exchanged for the hydroxyl group in the alcohol and the exchange is reversed after purification, may be used. The gross cut alcohol mixtures are separately esterified by contacting them with a large excess of a methyl borate rich methyl alcohol stream in a first exchange zone, vacuum stripped of substantially all non-esterified material, and regenerated by contacting the triesters formed with a large excess of a methyl borate lean methyl alcohol stream in a second exchange zone. The excess reactants are taken as overhead from the first and second exchange zones and introduced to a separate distillation zone wherein a methyl borate rich methanol stream is taken as bottoms for recycle to the first exchange zone and a methyl borate lean methanol stream is taken as overhead for recycle to the second exchange zone.

Turning now to FIGURE I of the accompanying drawings, a crude AM alcohol mixture having the following composition is used as the feed in the specific embodiment to be described hereinafter with reference to said accompanying drawings:

AM ALCOHOL FEED

| Component: | Mole percent |
|---|---|
| $C_2$–$C_{22+}$ alcohols | 62 |
| $C_2$–$C_{20+}$ olefins | 4 |
| $C_2$–$C_{20+}$ paraffins | 24 |
| Non-alcohol oxygen-containing organic compounds | 1 |
| Water | 9 |

Feed from a prior hydrolysis step at 100° F. and atmospheric pressure is pumped through line 4 by pump 5 at the rate of 6500 lbs./stream hour (#/s.h.) and heated in a steam heater 6 to a temperature of 250° F. before it is introduced into distillation vessel 7 which may be a packed tower. The low boiling alcohols, e.g. ethanol and butanol, are taken off overhead through line 8. The overhead stream, which in addition to the aforementioned alcohols contains water, $C_8$ and lower hydrocarbons and low boiling carbonyl compounds, is condensed in condenser 9 at 205° F. and sent to reflux drum 10 wherein water is continuously drawn off through line 11. The organic upper phase in drum 10 is continuously drawn off through line 12 by means of pump 13. A portion of the organic liquid in line 12 is refluxed at 205° F. to distillation vessel 7 through line 14 and the remainder is stored for use, for instance, as a motor fuel blending component. The bottoms from vessel 7 is withdrawn through line 15 and pumped by pump 17 to a second distillation vessel 16, which is a 21 plate bubble plate tower. A portion of the bottoms in line 15, which is at 305° F. and 18 p.s.i.a., is passed through a steam reboiler 18 and reintroduced into the bottom of vessel 7 through line 19 to supply heat to said vessel 7. Distillation vessel 16 operates at an overhead temperature of about 220° F. The vapor taken off overhead through line 20 is condensed and subcooled to 150 °F. by means of condenser 21 and withdrawn from drum 23 by means of pump 25 through line 22. A vacuum means, connected to drum 23 through line 24, maintains an overhead pressure of about 2.5 p.s.i.a. in distillation vessel 16. A part of the distillate in line 22, which comprises the crude $C_6$ to $C_{10}$ alcohol cut which is then purified in accordance with the invention, is refluxed to vessel 16 via line 160. The distillation bottoms, at ca. 440° F., from vessel 16 are continuously pumped by means of pump 27 through line 26 to a third distillation vessel 28 that has 14 plates. A portion of the bottoms is reboiled in furnace 29 and returned to vessel 16 through line 161. The distilland in vessel 28 has a temperature of 505° F. and is under 1 p.s.i.a. pressure; the equilibrium vapor leaving vessel 28 via line 30 is at 340° F. and under 0.48 p.s.i.a. pressure. The vapors in line 30 are condensed and subcooled to 200° F. in water condenser 31 and then collected in reflux drum 32 which is provided with a vacuum means via line 33. The distillate in drum 32 is withdrawn through line 34 by means of pump 35 and a portion is refluxed to vessel 28 via line 36. The remaining portion of the distillate, which is a crude $C_{12}$ to $C_{18}$ alcohol cut, is then purified in accordance with the invention. The bottoms of the distilland mixture in distillation vessel 28 is withdrawn through line 37 by means of pump 38 and a portion is reboiled in furnace 39 and introduced via line 40 to the bottom of said vessel. The remaining portion of the bottoms, which comprises about 95 mole percent $C_{20}$ to $C_{22+}$ alcohols is cooled to 150° F. and stored at this temperature to prevent solidification.

In FIGURE II, the $C_6$ to $C_{10}$ alcohol cut, obtained in the fractionation process described above and depicted in FIGURE I, is fed into a first esterification vessel 41 through line 42 and steam heater 43. The crude $C_6$ to $C_{10}$ alcohol cut, which is now water free and contains $C_8$ to $C_{14}$ hydrocarbons and carbonyls, is mixed and reacted at 200° F. and 15 p.s.i.a. with 200 mesh boric acid, which is introduced into esterification vessel 41 through line 152. The alcohol cut is fed into vessel 41 at the rate of 2950 #/s.h., while the boric acid is fed into said vessel at the rate of 350 #/s.h. (a 10–15 mole percent stoichiometric excess). Vessel 41, which has a suitable agitating means 44, is operated so that there is approximately a 70% conversion of alcohol to ester. The light hydrocarbons in this $C_6$ to $C_{10}$ alcohol cut facilitate the removal of the water of esterification. A hydrocarbon-water azeotrope is taken overhead from esterification vessels 41 and 50 through lines 45, 53 and 154, and condensed in a water condenser 46. The condensate from condenser 46 flows into a gravity separation drum 47 in which a phase separation takes place, yielding an upper hydrocarbon layer and a lower water layer. The lower water layer is drawn off and discarded via line 48 and the upper hydrocarbon layer is recycled to the esterification vessel 41 through line 49. The partially esterified reaction mixture in vessel 41 is transported to a second esterification zone 50 by means of pump 51 and line 52 wherein the esterification reaction is carried to essentially 100% completion. Esterification vessel 50, which is equipped with an agitating means 155, is maintained at the same temperature and pressure as vessel 41. The upper hydrocarbon layer in drum 47 may be reintroduced to either or both esterification vessels 41 and 50, whereas the fresh boric acid is preferably added only to vessel 41. The reaction mixture is continuouly withdrawn from the upper portion of vessel 50 by means of pump 54 and transported to a settling vessel 55 via line 56. Sufficient residence time is provided in settling vessel 55 at a liquid flow velocity of 1 foot per second or less to permit settling of the unreacted, solid boric acid particles to the lower portion of said vessel for withdrawal through line 57. A large liquid recycle stream transports this settled boric acid via line 57 and pump 59 to esterification vessel 41 via lines 60 and 42 or esterification vessel 50 via lines 61 and 52. Steam heater 58 raises the temperature of this recycle stream to 250° F., thereby imparting enough sensible heat to supply the heats of esterification and latent heats of vaporization of the hydrocarbon-water azeotropes in esterification vessels 41 and 50, as well as maintaining the required 200° F. reaction temperatures.

A clarified reaction product is continually withdrawn overhead from vessel 55 through line 62 and passed through a filtering means 63, such as a rotary leaf filter, wherein the remaining boric acid particles, e.g. 50 to 75 microns, are removed from the reaction product and withdrawn from the filter means 63 through line 64. The clear ester product is passed through a steam heater 65 which raises its temperature to 250° F. and then it is introduced into a 30 plate fractionation vessel 66 through line 67. The top of said vessel is maintained at about 4.4 p.s.i.a. and 210° F. and the lower boiling components in the ester product are thereby continually taken off overhead through line 68 which is connected to a water condenser 69 and a reflux drum 70. The distillate in drum 70 comprises $C_8$ to $C_{14}$ hydrocarbons, light carbonyls, and other non-esterifiable materials that were in the $C_6$ to $C_{10}$ alcohol cut. Vacuum line 71 connected to drum 70 provides the reduced pressure required in vessel 66. The distillate in drum 70 is continually withdrawn by means of pump 72 through line 73 and a portion of the distillate is refluxed to vessel 66 via line 74. The temperature of the remaining portion of the distillate is reduced from 140° to 100° F. by means of a cooler 75. It is then stored in vessel 76 for use, for instance, as fuel or feed for another process.

The ester product in the distillate mixture in vessel 66 is continuously withdrawn as bottoms at a temperature of 390° F. through line 77 by means of pump 78. A portion of the ester in line 77 is reboiled and recycled to vessel 66 through line 80 and furnace 81. The remainder is passed through a cooler 79 which reduces its temperature to 200° F. The cooled ester is introduced near the bottom of saponification vessel 82 where it is intimately contacted by means of a countercurrent gravity flow with about 50 parts by volume of a 10 wt. percent caustic solution which is introduced into saponification vessel 82 at an intermediate point through line 83. An aqueous solution of sodium borate and sodium hydroxide is withdrawn through line 153. The alcohol product of the saponification reaction is water scrubbed in the upper section of vessel 82 with water introduced through line 84 to remove entrained salts, caustic, etc. The scrubbed alcohol is withdrawn overhead from vessel 82 through line 85 and introduced to a settling drum 86. The lower layer, which is mainly water, is withdrawn from the bottom of drum 86 through line 87 and discarded, while the purified $C_6$ to $C_{10}$ alcohol product is drawn off the upper layer in drum 86 by means of pump 88 through line 89. The purified alcohol product in line 89 may be further dried by any suitable means, such as distillation and, if desired, the dried alcohols may be fractionated into substantially $C_6$, $C_8$ and $C_{10}$ alcohol fractions by fractional distillation. The alcohols purified in accordance with this embodiment are about 98 mole percent pure or purer and contain less than 0.1 mole percent carbonyls.

In FIGURE III, 2450 #/s.h. of the $C_{12}$ to $C_{18}$ alcohol cut, recovered in the gross fractionation process described above and depicted in FIGURE I, is introduced to a first esterification vessel 90 via line 91 wherein it is blended with a light hydrocarbon such as benzene, $C_6$ to $C_8$ naphtha, or the distillate stored in vessel 76 in FIGURE II. In any event, the light hydrocarbon, which is at ambient temperatures, is fed into line 91 through line 92 at the rate of about 300 #/s.h. and there it is admixed with the $C_{12}$ to $C_{18}$ alcohol cut. Boric acid (about 200 mesh) is continually fed into esterification vessel 90 through line 93 at the rate of 275 #/s.h. The boric acid is admixed with the feed by means of an agitating device 94 in vessel 90 which also serves to keep the boric acid in suspension. The esterification is carried out at 220° F. and atmospheric pressure. The water of esterification is continually taken off overhead through lines 95 and 96 as a water-hydrocarbon azeotrope which is condensed in a water condenser 97 and collected in a drum 98. Phase separation in drum 98 results in a lower water layer, which is withdrawn via line 99, and an upper hydrocarbon layer, which is refluxed to vessel 90 via line 100.

The reaction mixture in esterification vessel 90, which is operated at about 70% conversion, is continually withdrawn by means of pump 101 through line 102 and introduced into a second esterification vessel 103 having an agitating means 156 which is also operated at 220° F. and atmospheric pressure. A water-hydrocarbon azeotrope is continually taken off overhead through lines 104 and 96, cooled in water condenser 97 and collected in drum 98. The reaction mixture from esterification vessel 103, in which the esterification is carried substantially to completion, is continually withdrawn from the upper portion of said vessel by means of pump 105 through line 106 and transported to settling drum 107 where most of the unreacted boric acid particles settle out and are withdrawn through line 108 together with a large amount of liquid recycle. The recycle stream in line 108 is pumped by means of pump 110 to esterification vessels 90 and 103 through lines 111 and 91, and lines 112 and 102, respectively. Steam heater 109 raises the temperature of the recycle stream in line 108 from 220° to 250° F., thereby imparting enough sensible heat to supply the heats of esterification and latents of vaporization of the hydrocarbon-water azeotropes in esterification vessels 90 and 103 as well as to maintain the required reaction temperatures.

The clarified reaction product is continually withdrawn overhead from settling drum 107 by means of pump 113 through line 114. Filter means 115 removes the remaining fine boric acid particles, e.g. 50 to 75 microns, which are suspended in the esterification product. The boric acid fines are withdrawn from the filter through line 116 while the filtrate, which is at 220° F., is sent to a 40 plate fractionating vessel 117 through line 118. An overhead pressure of 0.75 p.s.i.a. and temperature of 140° F. are maintained in fractionating vessel 117 so that the non-ester components of the esterification reaction product are continually taken off overhead through line 119, condensed and subcooled in a water condenser 120, and collected in a drum 121. The distillate in drum 121 substantially comprises $C_{16}$ to $C_{20+}$ hydrocarbons, intermediate boiling carbonyl compounds, and the light hydrocarbon azeotroping agent which was added to the esterification vessels for water removal. A vacuum line 122 connected to drum 121 provides for the reduced pressure employed in fractionating vessel 117. The distillate collected in drum 121 is withdrawn by means of pump 123 through line 124 and a portion is refluxed to fractionating vessel 117 through line 125. The remaining portion of the distillate is transported to storage vessel 126.

The 400° F. bottoms of the distillate mixture in vessel 117 is continually withdrawn through line 127 by pump 128. A portion of the bottoms, which comprises essentially the boric acid triesters of the $C_{12}$ to $C_{18}$ alcohols, is reboiled and recycled to vessel 117 through line 129 and furnace 130. The remaining portion is saponified to release the corresponding alcohols by admixing it with 40 to 50 parts by volume of a 10 wt. percent caustic solution which enters line 127 via line 131. The resulting mixture at 290° F. is passed through orifice plate column 132 to a settling drum 136 via line 133. A portion of the saponified ester leaving column 132 is recycled through line 134 and pump 135 to insure complete saponification. The saponified ester is sent to a settling drum 136 wherein the aqueous caustic layer, containing sodium borates, settles to the bottom and is withdrawn through line 137. The upper alcohol layer in drum 136 is withdrawn by means of pump 138 through line 139 and water washed at 185° F. in a second orifice plate column 141. Water is introduced to line 139 through line 140, and a portion of the water-alcohol mixture leaving column 141 via line 144 is recycled through lines 142 and 139 by pump 143. The remaining portion is introduced into a settling drum 145. Phase separation in drum 145 results in a lower layer which comprises essentially water and an upper layer which comprises essentially purified $C_{12}$ to $C_{18}$ alcohols. The water is continually withdrawn from drum 145 through line 146 and the alcohol product is withdrawn through line 147. The alcohol product in line 147 is pumped by means of pump 148 through a filter 149 comprising suitable filtering means, e.g. fine mesh screens, to remove any entrained water in the somewhat viscous alcohol product. The entrained water removed by filter 149 is withdrawn through line 150 and substantially dry alcohol is continually withdrawn through line 151. If desired, the alcohol product may be separated into $C_{12}$, $C_{14}$, $C_{16}$ and $C_{18}$ alcohol fractions, or other combinations thereof, in a fractional distillation vessel. The alcohols purified in accordance with this embodiment are 98 mole percent pure or purer and contain less than 0.1 mole percent carbonyl compounds.

It is not intended to restrict the present invention to the foregoing embodiment, but rather it should only be limited by the appended claims in which it is intended to claim all the novelty inherent in the invention.

What is claimed is:

1. A process for separating and purifying a mixture of straight-chain primary alcohols wherein each of the alcohols contains from 2 to 22 carbon atoms, said alcohols being present in a mixture comprising 50 to 95 mole percent of said alcohols, 5 to 50 mole percent of olefinic and paraffinic substances and about 0.2 to 2 mole percent of carbonyl substances, the non-alcohol substances boiling in the same range as said alcohols, consisting of fractionating the mixture by distillation into gross fractions in which the carbon number spread of the alcohols in said fractions is not more than 6, reacting each fraction with a slight excess of finely divided, solid boric acid at about 200° to 280° F. in a first esterification zone for a sufficient time to esterify a major portion of the alcohols in said mixture, transferring the partially esterified mixture to a second esterification zone maintained at about the same temperature as the first esterification zone wherein essentially complete esterification of the alcohols occurs, withdrawing overhead from said first and second esterification zones an azeotrope comprising the water formed by the esterification reaction and at least a portion of said olefinic and paraffinic substances, separating said olefinic and paraffinic substances from the water, returning at least a part of the separated olefinic and paraffinic substances to each esterification zone, withdrawing the esterified mixture from said second zone and separating the excess, solid boric acid from the esterified mixture, passing the separated boric acid to the second esterification zone, stripping the unesterified substances from the esterified mixture in a distillation zone maintained at reduced pressure, withdrawing said unesterified substances from said distillation zone, saponifying the esterified mixture, separating the alcohol product from the saponified mixture, removing the water from said alcohol product and fractionally distilling said product into pure alcohol fractions, said pure alcohol fractions having a carbonyl content less than 0.1 mole percent.

2. A process for separating and purifying a mixture of straight-chain primary alcohols wherein each of the alcohols contains from 6 to 10 carbon atoms, said mixture comprising 50 to 95 mole percent of said alcohols, 5 to 50 mole percent of olefinic and paraffinic substances and about 0.2 to 2 mole percent of carbonyl substances, said substances boiling in the same range as said alcohols, consisting of reacting said mixture with a slight excess of finely divided, solid boric acid at about 200° to 280° F. in a first esterification zone for a sufficient time to esterify a major portion of the alcohols in said mixture, transferring the partially esterified mixture to a second esterification zone maintained at substantially the same temperature as the first esterification zone wherein substantially complete esterification of the alcohols occurs, withdrawing overhead from said first and second esterification zones an azeotrope comprising the water formed by the esterification reaction and at least a portion of said olefinic and paraffinic substances, separating said olefinic and paraffinic substances from the water, returning at least a part of the separated olefinic and paraffinic substances to at least one of said esterification zones, withdrawing the esterified mixture from said second zone and separating the excess, solid boric acid from the esterified mixture, passing the separated boric acid to the second esterification zone, removing the unesterified substances from the completely esterified mixture in a distillation zone maintained at reduced pressure, withdrawing said unesterified substances from said distillation zone, saponifying the distilled esterified mixture, separating the alcohol product from the saponified mixture, removing the water from said alcohol product and fractionating said product into pure alcohol fractions, said pure alcohol fractions having a carbonyl content less than 0.1 mole percent.

3. A process for separating and purifying a mixture of straight-chain primary alcohols wherein each of the alcohols contains from 12 to 18 carbon atoms, said mixture comprising 50 to 95 mole percent of said alcohols, 5 to 50 mole percent of olefinic and paraffinic substances and about 0.2 to 2 mole percent of carbonyl substances, said substances boiling in the same range as said alcohols consisting of blending said mixture with a $C_6$ to $C_8$ hydrocarbon, reacting the resulting mixture with a slight excess of finely divided, solid boric acid at about 200° to 280° F. in a first esterification zone for a sufficient time to esterify a major portion of said alcohols, transferring the partially esterified mixture to a second esterification zone maintained at substantially the same temperature as the first esterification zone wherein the alcohols in said mixture are essentially completely esterified, withdrawing overhead from said first and second esterification zones an azeotrope which comprises the water formed by said esterification reaction and at least a portion of said $C_6$ to $C_8$ hydrocarbon, separating said hydrocarbon from said water and returning at least a part of said hydrocarbon to at least one of said esterification zones, withdrawing the esterified mixture from the second esterification zone and removing the excess solid boric acid from said mixture, removing the unesterified substances from the completely esterified mixture in a distillation zone maintained at reduced pressure, withdrawing said unesterified substances from said distillation zone, withdrawing the esters from said distillation zone and saponifying said esters, separating the alcohol product from the saponified mixture, removing the water from said alcohol product and fractionally distilling said alcohol product into substantially pure alcohol fractions, said fractions having a carbonyl content of about 0.02 to 0.06 mole percent.

References Cited in the file of this patent

UNITED STATES PATENTS

| | | |
|---|---|---|
| 2,068,415 | Klipstein | Jan. 19, 1937 |
| 2,545,889 | MacLean | Mar. 20, 1951 |
| 2,587,753 | O'Connor et al. | Mar. 4, 1952 |
| 2,885,446 | Sharp et al. | May 5, 1959 |
| 2,897,244 | Selwitz et al. | July 28, 1959 |

FOREIGN PATENTS

| | | |
|---|---|---|
| 158,383 | Australia | Aug. 23, 1954 |
| 633,979 | Great Britain | Dec. 30, 1949 |